United States Patent
Stewart et al.

(10) Patent No.: US 9,624,388 B2
(45) Date of Patent: Apr. 18, 2017

(54) PARA-ARAMID-REINFORCED GEL FOR PLASTER REHABILITATION

(71) Applicant: Historic Plaster Conservation Products Limited, Port Hope (CA)

(72) Inventors: Roderick Milton Stewart, Port Hope (CA); Mark Harnden, Port Hope (CA); Ray Tiedemann, North Arlington, NJ (US)

(73) Assignee: Historic Plaster Conservation Products Limited, Port Hope, Ontario (CA)

( * ) Notice: Subject to any disclaimer, the term of this patent is extended or adjusted under 35 U.S.C. 154(b) by 343 days.

(21) Appl. No.: 14/470,989

(22) Filed: Aug. 28, 2014

(65) Prior Publication Data
US 2015/0059961 A1    Mar. 5, 2015

(30) Foreign Application Priority Data

Aug. 28, 2013 (CA) ...................................... 2825343

(51) Int. Cl.
*E04B 2/00* (2006.01)
*E04F 13/00* (2006.01)
(Continued)

(52) U.S. Cl.
CPC ............ *C09D 7/1291* (2013.01); *C09D 5/04* (2013.01); *C09D 5/34* (2013.01); *C09J 133/00* (2013.01);
(Continued)

(58) Field of Classification Search
CPC .... C08L 2666/02; C08F 265/06; C04B 26/00; C04B 26/02; C04B 26/04; C04B 26/06;
(Continued)

(56) References Cited

U.S. PATENT DOCUMENTS 5,747,553 A    5/1998   Guzauskas
6,071,833 A    6/2000   D'Alisa et al.
(Continued)

FOREIGN PATENT DOCUMENTS

JP    03194057    8/1991
JP    2004189909  6/2004
(Continued)

*Primary Examiner* — Philip Tucker
*Assistant Examiner* — Brian R Slawski
(74) *Attorney, Agent, or Firm* — Rowand LLP (57) ABSTRACT

Described is a thixotropic para-aramid gel that includes a polymer resin, an alkali-soluble anionic thickener, an adhesion promoter, and para-aramid pulp fibers. The polymer resin includes at least one of an acrylate copolymer and a styrene-acrylate copolymer. Also described is a method of producing the para-aramid gel for plaster reinforcement. The method includes mixing the polymer resin, the alkali-soluble anionic thickener, and the adhesion promoter to create a thixotropic gel, and then spinning para-aramid pulp fibers into the thixotropic gel using a high shear mixer. A method of reinforcing a plaster ceiling is also described. The method includes inserting a plurality of fasteners into a visible surface of the ceiling, leaving a portion of each fastener exposed at or above the visible surface, and applying a layer of the para-aramid-reinforced thixotropic gel to the visible surface and encapsulating the portion of each fastener within the layer.

15 Claims, 5 Drawing Sheets (51) Int. Cl.

| | |
|---|---|
| *B29C 73/00* | (2006.01) |
| *B32B 43/00* | (2006.01) |
| *B29C 47/00* | (2006.01) |
| *B29C 65/00* | (2006.01) |
| *B32B 27/00* | (2006.01) |
| *B32B 37/00* | (2006.01) |
| *B22D 19/10* | (2006.01) |
| *B23K 9/04* | (2006.01) |
| *B23P 6/00* | (2006.01) |
| *B05D 3/00* | (2006.01) |
| *B28C 5/00* | (2006.01) |
| *B32B 7/12* | (2006.01) |
| *C09D 7/12* | (2006.01) |
| *C09D 5/04* | (2006.01) |
| *E04G 23/02* | (2006.01) |
| *C09D 5/34* | (2006.01) |
| *C09J 133/00* | (2006.01) |
| *C09J 133/08* | (2006.01) |
| *B29C 73/02* | (2006.01) |
| *B32B 13/12* | (2006.01) |
| *B32B 27/30* | (2006.01) |
| *B32B 13/14* | (2006.01) |
| *C08L 77/10* | (2006.01) |

(52) U.S. Cl.
CPC ............ *C09J 133/08* (2013.01); *E04G 23/02* (2013.01); *E04G 23/0218* (2013.01); *B29C 73/02* (2013.01); *B32B 13/12* (2013.01); *B32B 13/14* (2013.01); *B32B 27/308* (2013.01); *C08L 77/10* (2013.01)

(58) Field of Classification Search
CPC .............. C04B 20/0048; C09J 2433/00; E04G 23/0203; E04G 23/02; E04G 23/0218; Y10T 29/49746; Y10T 29/49718; B29C 73/00; B29C 73/02; B32B 13/00; B32B 13/04; B32B 13/12; B32B 13/14; B32B 2255/00; B32B 2260/00; B32B 2260/04; B32B 2260/048; B32B 27/30; B32B 27/308
USPC .... 156/71, 94, 244.12, 280, 332; 29/402.18; 427/140; 264/36.2; 428/355 AC
See application file for complete search history.

(56) References Cited

U.S. PATENT DOCUMENTS

| | | | |
|---|---|---|---|
| 7,132,469 | B2 | 11/2006 | Guzauskas |
| 7,183,334 | B2 | 2/2007 | Guzauskas |
| 7,723,421 | B2 | 5/2010 | Guzauskas |
| 7,786,225 | B2 | 8/2010 | Yasumura et al. |
| 7,790,796 | B2 | 9/2010 | Foster et al. |
| 8,206,808 | B2 | 6/2012 | Khan et al. |
| 8,242,217 | B2 | 8/2012 | Urakawa et al. |
| 8,362,135 | B2 | 1/2013 | Brennan et al. |
| 2013/0190436 | A1* | 7/2013 | Stewart .................. C09J 133/04 524/261 |

FOREIGN PATENT DOCUMENTS

| | | |
|---|---|---|
| JP | 2004360351 | 12/2004 |
| JP | 2005008841 | 1/2005 |
| KR | 914048 | 8/2009 |

* cited by examiner

PARA-ARAMID-REINFORCED GEL FOR PLASTER REHABILITATION

CROSS-REFERENCE TO RELATED APPLICATIONS

The present application claims priority to Canadian patent application serial no. 2,825,343, filed Aug. 28, 2013, the contents of which are hereby incorporated by reference.

FIELD

The present application generally relates to restoration work in connection with plaster ceilings and walls, and, in particular, to a para-aramid-reinforced gel for plaster rehabilitation and conservation.

BACKGROUND

Many historic and architecturally significant buildings have plaster ceilings, walls, and ornamental features. In many of these buildings, over time, the plaster becomes structurally compromised as the mechanical keys that physically hold the plaster onto the lath break. In some cases, the plaster begins to pull away from the lath and starts to sag or fall. In other types of buildings, ceilings may be constructed from plaster panels containing organic plant-based fibers for structural reinforcement. The fibrous plaster panels may be secured to structural framing members solely with plaster-soaked fibers bonded to the backside of the panels and looped over the framing members. Over time, with building movement and water infiltration, the plaster degrades and the organic fibers may become brittle and break, particular if exposed to moisture.

Conservation and restoration work aims to preserve plaster ceilings that are in danger of falling. Historically, one technique for reattaching plaster has been to apply a fast-drying liquid slurry layer of wire or mesh reinforced plaster along the upper side (attic side) of the lath (if it is accessible) so as to bond to the remaining keys and the stubs of the broken keys. Sometimes, a bonding agent is applied to the upper side of the lath and plaster. However, this added weight may be a concern in some cases, and the bond line between the old plaster and the new plaster can be a weak point. Once the material has been applied, no further inspection of the plaster can occur because the bond line is obscured by the newly-applied material.

Another technique that has been used is the injection of a formulation of acrylic-resin-based adhesive into the space between the plaster and the lath. The adhesive may be injected from the backside or, if inaccessible, through holes drilled into the front of the plaster, although the latter approach defaces and damages the plaster when small injection holes are drilled in its visible front surface. This is unsuitable for plaster decorated with valuable paintings or wall coverings. The adhesive fills the gaps between the upper surface of the plaster and the laths and makes a new bonded connection at each location where the adhesive has been injected. An example of adhesive grout for this type of work is described in U.S. patent application Ser. No. 13/749,375, filed Jan. 24, 2013, and owned in common herewith, the contents of which are hereby incorporated by reference.

The injection of grout can be a difficult and expensive process. It may require precision application, which is not easy to achieve in the case where it is being injected through holes in the surface. A full scaffolding installation may be necessary to carry out these types of repairs. Alternatively, full access to the upper side of the ceiling is required. In such a case, significant cleaning of the accumulated debris and dust is necessary before treatment can occur.

These techniques all require access to the structural back of the ceiling or the drilling of holes into the face of the plaster to inject material that, hopefully, bonds to the backside of the plaster. In some situations, the cost and difficulty of this type of rehabilitation cannot be justified, which leads building owners to consider other options. One of the other options is to install a new material over the face of the plaster ceiling. In some cases, this involves laminating drywall (e.g. gypsum board or other such material) over the face of the old failing plaster ceiling. Drywall ceilings installed directly over plaster often exhibit visible joints and sagging in a short period of time, or require the installation of strapping or furring lumber across the face of the plaster, and then the attachment of the drywall to the strapping. Either approach involves the addition of significant weight and, often, destructive drilling into the plaster.

Another option for covering the face of the existing plaster ceiling is to attach wire, wood or plastic mesh or lath to the plaster ceiling surface and then apply a new plaster coat (often multiple coats). The plaster may be conventional or synthetic.

Drywall installation or new plaster coats also usually involve full scaffolding and a great degree of debris and dust. Both add significant weight to the structure.

It would be advantageous to avoid adding significant weight while still structurally reinforcing historic plaster.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

In one aspect, the present application describes a thixotropic para-aramid gel for plaster reinforcement. The gel includes a polymer resin, wherein the polymer resin includes at least an acrylate copolymer; an alkali-soluble anionic thickener; an adhesion promoter; and para-aramid pulp fibers.

In another aspect, the present application describes a method of producing a para-aramid gel for plaster reinforcement. The method includes mixing a polymer resin, an alkali-soluble anionic thickener, and an adhesion promoter to create a thixotropic gel, wherein the polymer resin includes at least an acrylate copolymer; and spinning para-aramid pulp fibers into the thixotropic gel using a high shear mixer.

In yet a further aspect, the present application describes a method of reinforcing a plaster ceiling, the plaster ceiling having a visible surface. The method includes inserting a plurality of fasteners into the visible surface, leaving a portion of each fastener exposed at or above the visible surface; and applying a layer of para-aramid-reinforced gel to the visible surface and encapsulating the portion of each fastener within the layer.

In yet another aspect, the present application describes a fastener used in reinforcing a plaster ceiling by providing a thin secure surface to which a layer of para-aramid-reinforced gel will bond to encapsulate the plaster ceiling.

In yet a further aspect, the present application describes a custom washer for installation in a plaster surface using a screw. The custom washer is a circular washer formed from a thermoplastic and has cupped-underside forming a skirt portion that tapers to a knife-edge at its outer periphery, the inner periphery of the skirt portion meeting an axial countersink portion formed by a downwardly-tapered funnel having a central bore.

Other aspects and features of the present application will be understood by those of ordinary skill in the art from a review of the following description of examples in conjunction with the accompanying figures.

Figure 1:
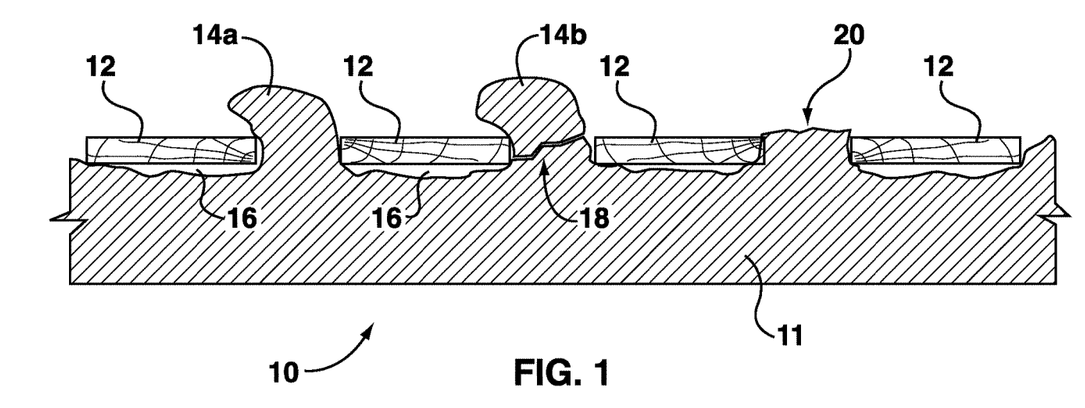
FIG. 1 shows an cross-sectional view of one example of a plaster ceiling.

Reference is first made to FIG. 1, which shows a cross-sectional side view of one example of a historic plaster ceiling 10. The ceiling 10 is constructed using a plurality of spaced-apart thin wooden laths 12 fastened to the structure of the building. The plaster 11 is applied to the underside of the laths 12. Portions of the plaster 11 extrude through the gaps between the laths to form keys-and-lugs 14 (individually labeled 14a, 14b). The lug is the blob-shaped portion of plaster protruding above the laths and the key is the neck portion between the laths connecting the lug to the plaster 11 ceiling.

Over time, the plaster 11 may pull away from the laths 12, leaving gaps 16. The keys-and-lugs 14 may also become cracked at the key portion, as indicated by reference numeral 18, or break completely off, as indicated by reference numeral 20. As more keys 14 become cracked or broken the additional weight otherwise supported by those broken keys must be borne by the remaining keys-and-lugs in a load transfer process causing the ceiling to sag and, eventually, collapse.

Figure 6:
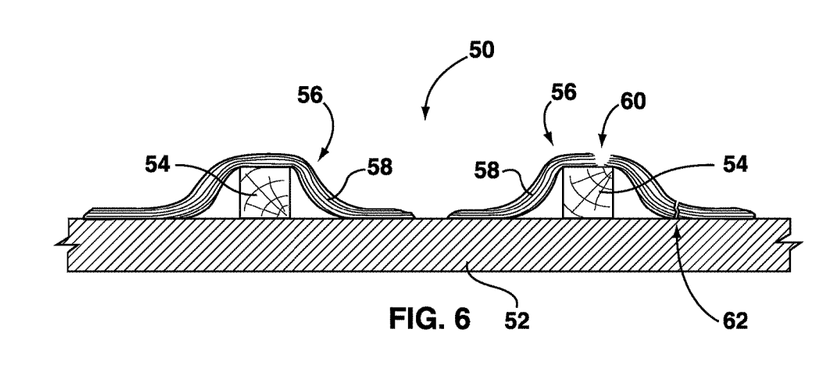
FIG. 6 shows a cross-sectional view of one example of a fibrous plaster panel ceiling.

Reference is now also made to FIG. 6, which shows a cross-sectional view of another example of a historic plaster ceiling 50. The ceiling 50 in this example is constructed from fibrous plaster panels 52 attached to framing members 54. The framing members 54 may be wood or metal. Cast fibrous plaster panels of different types were commonly used between about 1860 and 1935. The plaster panels were internally reinforced by organic fibers, such as jute, canvas, tow, hemp, flax or excelsior. In many instances the plaster panels 52 were secured to the framing members 54 by an arch of plaster-soaked organic fibers 56. In the trade, the arch is sometimes referred to as a "wad". Although FIG. 6 shows the wad spanning a framing member 54 that is flush against the upper side of the panel 52, in many cases the wad is looped across a structural member spaced above the panel 52 by 12-24 inches. The construction technique involved putting the panel 52 into place and then dipping a handful of organic strings or ropes 58, often burlap or jute, into a container of wet plaster to saturate the organic material. The handful of plaster-soaked strings were then laid across a framing member 54 such that the ends made contact with the plaster panel 52, thereby forming the wad across the framing member 54.

Organic fibers, like jute, although entirely or partly encased in plaster, may degrade/desiccate with time if exposed to vibration, moisture, or other factors. If that occurs, then they may offer little or no strength to the plaster panel 52 or the plaster wad created over the framing member 56. Because the fibers are encased in plaster, they are not available for inspection. Moreover, the wad relies upon the plaster bonding to the backside of the plaster panel 52. The plaster bond may crack or break over time, as indicated by reference numeral 62. The wad itself may degrade and the plaster may crack or crumble, and the jute fibers, having lost flexibility over time and become brittle, may crack or break, as indicated by reference numeral 60.

It will be appreciated that heritage plaster ceilings eventually require remediation and repair.

Figure 2:
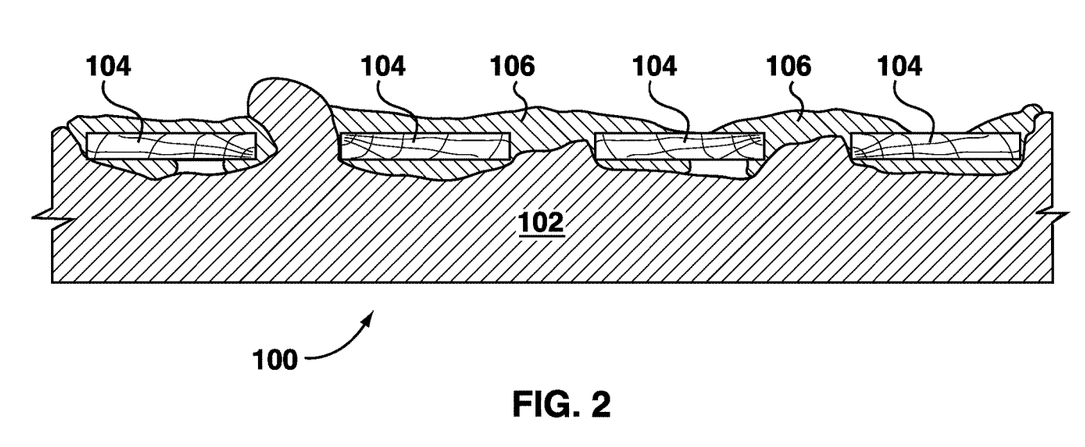
FIG. 2 shows a cross-sectional view of an example grout-based repair to a plaster ceiling.

FIG. 2 shows, in cross-section, one example technique for preserving a heritage plaster ceiling 100. This technique requires access to the back of the ceiling 100. If access is not available, then the technique may require the drilling of a grid of holes through the surface of the plaster 102 in order to inject material. The backside of the plaster 102 is first cleaned and broken or cracked keys are removed. Multiple saturating applications of an acrylic resin, in increasing concentrations, may then be applied to penetrate the plaster and form a bond between it and the laths 104. A plaster grout or other adhesive product 106, such as the grout described in U.S. patent application Ser. No. 13/749,375, filed Jan. 24, 2013, may then be injected into voids and gaps between the plaster 102 and the lath 104 to create new or repaired connections attaching the plaster 102 to the lath 104. This process takes advantage of the existence of spaces between the lath and the plaster into which the acrylic resin may flow.

Figure 3:
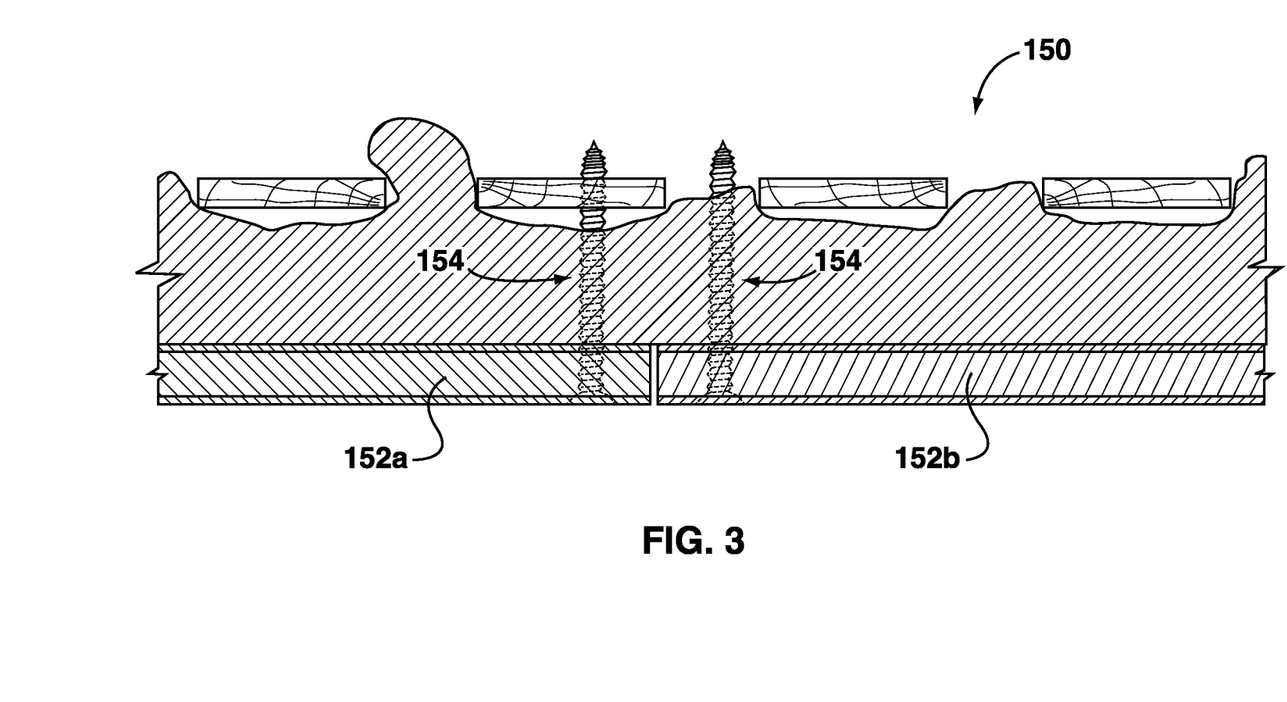
FIG. 3 shows a cross-sectional view of a laminated drywall ceiling secured below a plaster ceiling.
Figure 4:
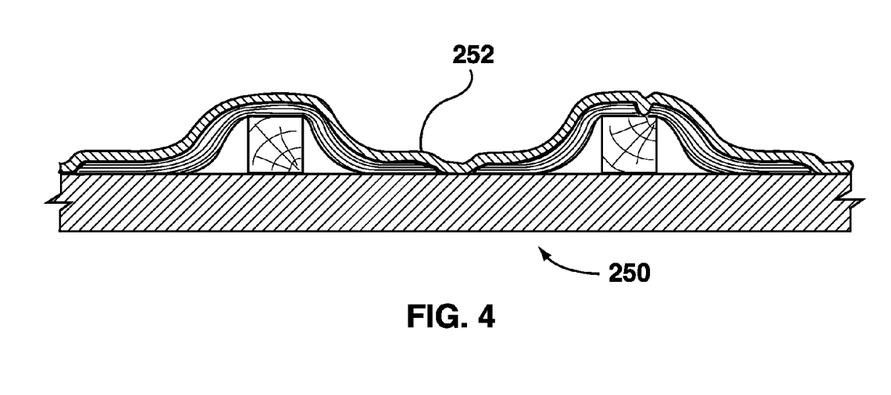
FIG. 4 shows a cross-sectional view of a plaster panel ceiling having had an aramid gel layer applied to its upper surface.
Figure 5:
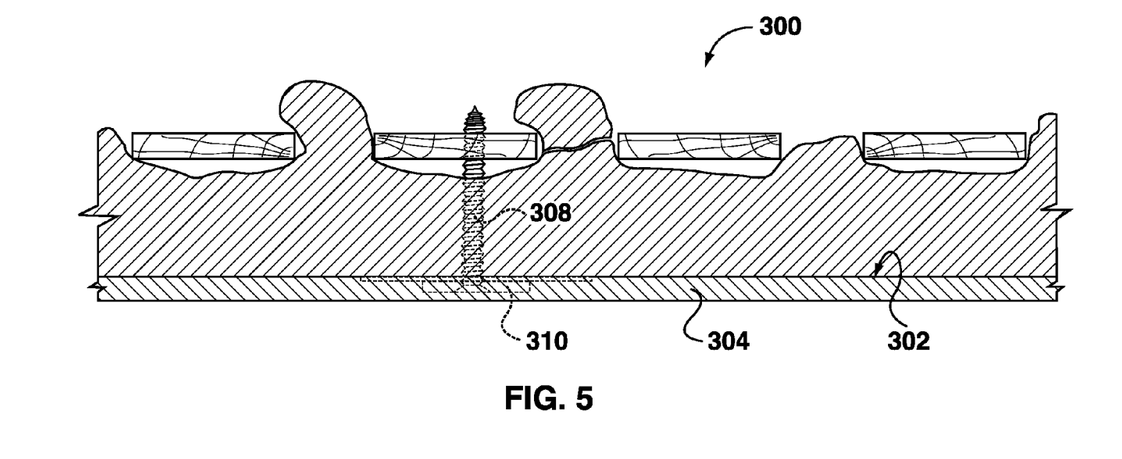
FIG. 5 shows a cross-sectional view of a plaster ceiling having had an aramid gel applied to its visible surface.

FIG. 3 shows, in cross-section, another example technique for remediating a failing plaster ceiling 150. In this example, a drywall ceiling is built below the plaster ceiling 150. Individual panels of drywall 152 (shown individually as 152a and 152b), usually as thin and light as may be available, are laminated over the existing plaster ceiling 152. Drywall screws 154 may be used to secure the drywall 152 to the plaster ceiling 152. The edges of the drywall 152 panels do not necessarily meet at a framing member behind the plaster, so the panel edges are not necessarily reliably screwed into a rigid framing piece. In some cases, the screws 154 may gain purchase on a lath, although sometimes of poor strength, and in some cases, the screws 154 may only gain purchase on plaster. Screwing the drywall 152 into the plaster at regular intervals necessarily does significant damage to the surface of the plaster, particularly since drywall screws 154 are torqued sufficiently to draw the head of the drywall screw 154 into the drywall and at least flush with the surface to avoid visible screw heads. Taping, mudding, and sanding are used to disguise the edges of the panels and the screw locations, but the unreliability of the screw attachments often leads to visible sagging and edges in these types of installations. Notably, drywall screws are typically designed to support the weight of drywall and not also the failed plaster ceiling. This typically leads installers to use about twice as many screws as might be used in an ordinary drywall ceiling.

In some cases (not illustrated), a substructure of strapping or furring lumber is installed across the visible surface of the plaster ceiling 150 and the drywall is then screwed into the substructure. This may alleviate some of the joint issues, but adds significant weight and cost, and additional holes across the surface of the plaster ceiling 150.

In accordance with one aspect of the present application, a para-aramid-reinforced thixotropic gel suitable for plaster reinforcement is described. The gel may be sprayed or otherwise applied to the backside of fibrous plaster-panel type ceilings, in order to form a light-weight strong web or membrane that binds together the plaster and support structure. The membrane is non-toxic and highly water-resistant, thereby allowing it to encase and protect organic material used in construction of plaster panels or plaster support arches. The membrane spanning the panel and support arches may provide sufficient tensile strength and support to the plaster panel to make any remaining support supplied by the organic materials in the arch superfluous.

In accordance with another aspect of the present application, the para-aramid-reinforced thixotropic gel may be sprayed or otherwise applied to the visible surface of a plaster ceiling to encapsulate broken plaster and prevent further deterioration. In some cases, structural pieces may be added to the existing plaster ceiling, such as screws/bolts and washers, to which the membrane may bond, thereby providing a grid of solid attachment points securing the membrane in place and supporting the plaster above.

In one aspect, the gel is reinforced through the use of para-aramid fibers and, in a particular example, para-aramid fibers like DuPont™ Kevlar® fibers produced by E. I. du Pont de Nemours and Company, or Twaron® fibers produced by Teijin Aramid B.V. The para-aramid fibers, although very light, provide significant tensile strength to the gel. Other para-aramid or para-aramid-like fibers may also be used in other embodiments.

In one embodiment, the para-aramid gel includes a gel formed from a polymer resin, an alkali-soluble anionic thickener, and an adhesion promoter. Para-aramid fibers are added to the gel mixture to form the para-aramid gel.

The polymer resin may be any suitable acrylic resin that, when combined with an anionic thickener, forms a thixotropic gel suitable for plaster repair. The acrylic resin may include an acrylate copolymer, in some cases. One example of an acrylate copolymer is Acronol® NX 4623 produced by BASF Corporation. Other polymer resins may also or alternatively be used.

In one example, the thixotropic gel contains between about 60% and 80% acrylic resin by weight. In one example, the thixotropic gel contains about 70% acrylic resin by weight and, in a specific example, the acrylic resin is Acronol® NX 4623. In another example, the gel contains about 65% Acronol® NX 4623 and about 5% Acronol® S 702, by weight.

The anionic thickener may be any suitable thickener that, when combined with the selected polymer resin(s) produce the thixotropic gel suitable for plaster repair. The thickener may be selected on the basis that it improves low shear rate viscosity and helps produce a gel characteristic under normal pressure that reduces sag, spatter, or dripping. One example of an anionic thickener is Acrysol™ ASE-60 produced by Rohn and Haas Company.

In one example embodiment, the thixotropic gel contains between about 20% and 30% thickener by weight. In one example, the thixotropic gel contains about 25% anionic thickener by weight and, in a specific example, the anionic thickener is Acrysol™ ASE-60.

The adhesion promoter may be any suitable bonding agent for improving the adhesion characteristics of the acrylic resin. An adhesion promoter may be selected on the basis that it is suitable for use in mortars for adhesion to plaster, wood, metal and other substrates. In one embodiment, the adhesion promoter is a dispersion based on vinyl acetate and ethylene. One example of the adhesion promoter is VINNIPAS® 446 ND (526BP) produced by Wacker Chemical Corporation. In another example, the adhesion promoter may include a styrene-acrylate copolymer. One example of a styrene-acrylate copolymer is Acronol® S 702 produced by BASF Corporation.

In one example embodiment, the thixotropic gel contains between about 1% and 10% adhesion promoter by weight. In one example, the thixotropic gel contains about 5% adhesion promoter by weight and, in a specific example, the adhesion promoter is VINNIPAS® 446 ND (526BP).

The resin and thickener may be selected such that, when combined, they produce a thixotropic composition, meaning that it is in a gel state under normal pressure and that it liquefies under the pressure of spraying/extrusion.

In one embodiment, the para-aramid gel is formed by mixing the polymer resin, the anionic thickener, and the adhesion promoter to form the thixotropic gel. The mixing may be performed at low speed with low shear until the mixture is substantially homogenous. Para-aramid pulp fibers, such as Kevlar® fibers or Twaron® fibers, for example, are then spun (whipped) into the thixotropic gel mixture at high shear. In one example, the para-aramid fibers may be present in the mixture in a quantity of about 1% to 5%, by weight. In a specific example, the para-aramid gel contains about 2% aramid fibers, by weight. The fibers may be added in small amounts to avoid clumping. The mixing of the fibers may occur at high speed with high shear.

In one example, the mixer used may have a side-sweeper and a high shear blade. The mixing may occur at about 2000 rpm, in one embodiment.

In some examples, once the para-aramid gel has been mixed to a desired consistency, it is then degassed. Degassing may occur using a vacuum degasser, for example. In one embodiment, the degasser pulls at least 28 inches of mercury in the degassing process.

The degassed para-aramid gel may then be pressed into appropriate containers. In one example, the container may include a cartridge or in bulk form. The bulk form may be suitable for cases where the material is applied by roller or brush, or using equipment that includes spray equipment that uses an airless sprayer with an aerating tip.

In yet a further embodiment, the para-aramid gel may contain one or more pigments. The pigment may be any suitable pigment provided it does not compromise the thixotropic or tensile strength properties of the para-aramid gel.

In yet another embodiment, the para-aramid gel may contain a biocide. The biocide may be present in an amount by weight of between 0.1% and 0.2%. One example biocide is Proxel® GL produced by Arch UK Biocides Limited, of the United Kingdom.

The following table provides one illustrative, but non-limiting, example of a para-aramid gel composition in accordance with the present invention:

| Ingredient | Weight % (range) |
|---|---|
| Acrylic resin (Acronol ® NX 4623) | 65-75% |
| Anionic thickener (Acrysol ™ ASE-60) | 20%-30% |

-continued

| Ingredient | Weight % (range) |
| --- | --- |
| Adhesion promoter (VINNIPAS ® 446 ND (526BP)) | 3-8% |
| Para-aramid pulp fibers (Kevlar ®) | 1-3% |

The example para-aramid gel may have a specific gravity of about 1.00-1.05 g/mL.

In at least some embodiments, the para-aramid gel with suspended para-aramid fibers is light enough that conventional air sprayers cannot be used to apply the material. For example, in many implementations an air pump and wand will push the resin-based gel out the spray nozzle, but the lightweight para-aramid fibers end up sidelined within the wand system, perhaps, in part, due to cavitation. In effect, air sprayers result in destabilizing the suspension causing removal of the para-aramid fibers prior to spray of the gel. Accordingly, in accordance with one aspect of the present application, the para-aramid gel is applied using a hydraulic pump to compress and liquefy the gel suspension in a nozzle. The nozzle is provided with an aerating tip to inject air in the liquefied mixture, causing a spray. In small implementations, in one example, a pneumatic caulking gun or similar mechanism may provide the hydraulic pump operation, at least in the case where the para-aramid gel is packaged in a cartridge.

When sprayed using a nozzle that creates a fine mist, the para-aramid gel may be uniformly deposited on the front surface or backside of a plaster ceiling. The para-aramid gel adheres well and forms a strong web or membrane. The resulting membrane is very lightweight, often only adding 1 to 2 oz per square foot. In at least some embodiments of the para-aramid gel dries to provide a very slightly pebbled surface that takes paint well.

Reference is now also made to FIG. 4, which shows a cross-sectional view of a plaster panel ceiling 250. The plaster panel ceiling 250 has had a layer of para-aramid gel 252 applied to its upper or attic side via spraying. The para-aramid gel 252 membrane coats the visible plaster and encapsulates the fibrous plaster panels and fibrous plaster wads attaching the panels to the framing members. Thus, the fibers may be protected from moisture and any cracked or broken plaster is bonded together by the para-aramid-reinforced membrane. Although FIG. 4 shows the wad spanning a framing member 54 that is flush against the upper side of the panel 52, in many cases the wad is looped across a structural member spaced above the panel 52 by 12-24 inches. Nevertheless, the para-aramid gel 252 would be sprayed so as to encapsulate the wad looped over the structural member.

Reference is now also made to FIG. 5, which shows a cross-sectional view of a plaster ceiling 300 having a visible surface 302 to which the para-aramid gel 304 is applied. Although a layer of para-aramid gel 304 may be applied across the ceiling itself, the membrane itself and its bond with the plaster surface may be insufficient to withstand the force of a larger plaster failure and may cause more widespread failure as the membrane pulls away at a larger area of the plaster surface. Accordingly, in some embodiments the layer of para-aramid gel 304 may be supplemented with a grid or pattern of small mechanical supports.

In one example, the mechanical support is a fastener inserted through the plaster and into the lath or other structural member. The exposed end of the fastener is not countersunk into the plaster, since that would deface and crack the plaster surface, but rather is allowed to sit just atop the plaster surface. In one embodiment, small applications of a grid of patches of the para-aramid gel may be applied to the surface before inserting the fasteners. A "pre-fastener" patch of para-aramid gel is shown in FIG. 5 by reference numeral 306.

In this example embodiment, the fastener is a screw 308 and washer 310. To maximize the surface area available for bonding to the para-aramid gel, the washer 310 may be a large area flat fender washer or the like. Contrary to drywall and similar materials, the screw 308 is not torqued to the point of countersinking, but simply enough to hold the washer 310 flush against the surface 302 of the plaster. The washers 310 may be countersunk to accommodate the screw head. This helps avoid the plaster breakage that would otherwise occur when the torque creates longitudinal forces imparted by the threads onto small areas, causing crumbling and crushing of the plaster.

After the fasteners are in place, the layer of para-aramid gel 304 is applied, sandwiching the washers between the earlier-applied patch 306 and the finish layer 304. The result is a para-aramid-reinforced web or membrane spanning the ceiling and supported at multiple points. The fasteners may be spaced apart by 6 to 12 inches in some example installations. It will be understood that other spacings may be used depending on the specifics of an installation.

In one embodiment, rather than applying the para-aramid gel patches to the surface of the ceiling, the patches may be created ahead of time and provided with an adhesive backing. In one embodiment, each patch 306 is formed together with a washer. The patch 306 may be sprayed onto a peel-and-stick adhesive paper, for example, and the washer 310 placed on the patch 306 before drying. Once the patch 306 is dry, it may then be secured in place on the ceiling by peeling off the backing and sticking the patch/washer to the ceiling. The screw 308 may then be inserted to secure the patch/washer in place and the final layer of para-aramid gel 304 applied.

In the case of a metal lath or wire and plaster ceiling, the fasteners used may, in some examples, include toggle bolts and washers. The toggle bolts in such an installation may have flat heads to ensure the head and washer lay as flat against the existing plaster surface as possible.

In one embodiment, to ensure the fastener, specifically the washer, is not visible after application of the thin layer of para-aramid gel, a custom washer is used. Reference is now made to FIGS. 8 and 9, which show an example embodiment of the custom washer 500. FIG. 8 shows a top view of the washer 500 and FIG. 9 shows a cross-sectional view of the washer 500 along line a-a.

The custom washer 500 has a relatively large surface area that tapers to a knife-edge 502 at its outer edge. The thinness of the knife-edge is determined partly by the material out of which the custom washer 500 is made and associated manufacturing tolerances. In one embodiment the washer 500 is made from polycarbonate, or other thermoplastic polymers suited to mild deflection or deformation without cracking or breaking, but having sufficient rigidity to act as a support for the plaster under the washer 500 once installed. In an example embodiment, a polycarbonate custom washer may be manufactured with a knife-edge 502 that is 0.0010 inches thick. The custom washer 500 may be approximately 2 inches in diameter in some embodiments.

In some embodiments, the custom washer 500 is thicker towards its center, which features a central bore 504, and the thickness gradually tapers in a radial direction to the knife-edge 502. In other embodiments, the custom washer 500 is of a consistent thickness.

Figure 8:
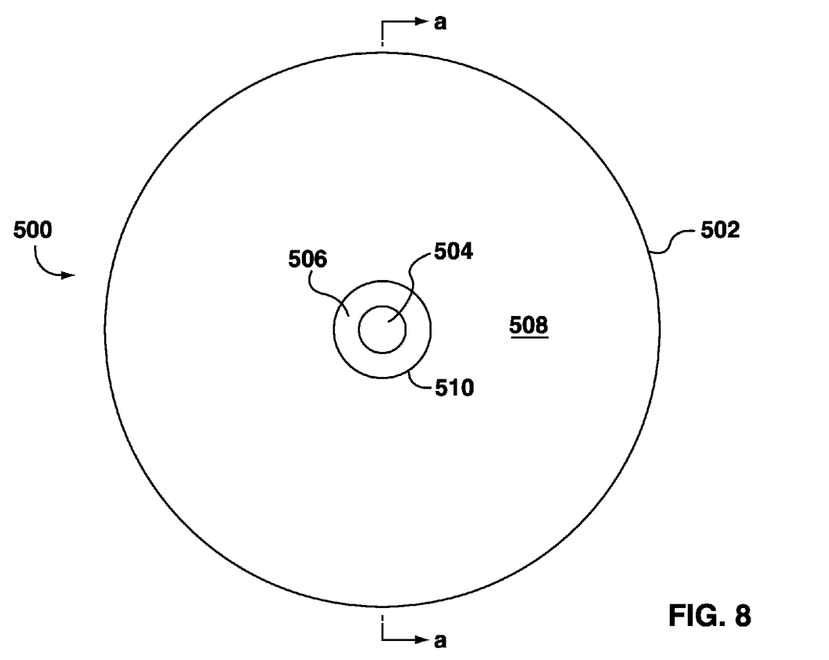
FIG. 8 shows a top view of an example custom washer for installation on the surface of a plaster ceiling to support application of a layer of para-aramid gel.
Figure 9:
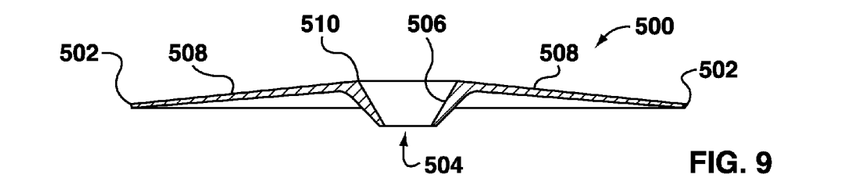
FIG. 9 shows a cross-section of the example custom washer.

In the example washer 500 shown in FIGS. 8 and 9, the custom washer 500 is slightly cup shaped, i.e. it has a cone-shaped or convex upper surface 508 that forms a skirt around the central bore 504. In this embodiment, the outer surface 508 inflects at an inner rim 510 to taper downwards so as to form a funnel portion 506. The funnel portion 506 is shaped to allow for counter-sinking of a screw. The central bore 504 is sized to permit insertion of the shaft of the screw, such as a #8 size wood screw or the like, depending on the intended application.

Figure 10:
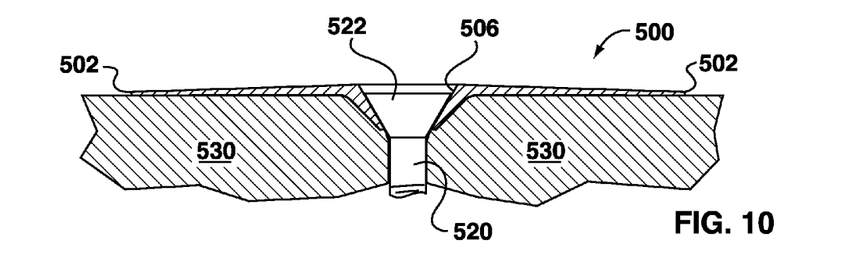
FIG. 10 shows a cross-sectional view of the example custom washer installed in a plaster surface.

Reference is now made to FIG. 10, which show a cross-sectional view of the custom washer 500 installed in a plaster surface 530 using a screw 520. The counter-sunk funnel portion 506 of the custom washer 500 is pressed into the plaster surface 530 as the head 522 of the screw 520 bears against the washer 500. The pressure of the screw 520 against the counter-sunk funnel portion 506 of the custom washer 500 further causes the cupped washer skirt to deflect and flatten against the plaster surface 530. In some cases, a countersink may be used to prepare a slight depression in the plaster surface in advance of installing the custom washer 500 so as to avoid any crushing as the screw 520 is torqued. In this manner, the custom washer 500 is ensured to closely bear against the plaster surface 530 with mild pressure all along its peripheral knife edge 502, thereby ensure close contact and as little discontinuity between the surface of the plaster and the face of the washer as possible.

After installation, a small amount of grout may be inserted into the screw head 522 drive, whether it is slot, Phillips, Robertson, or another screw drive type, so that the drive hole is not visible after application of the layer of para-aramid gel. The grout may be a non-shrinking acrylic caulk.

Advantageously, application of the para-aramid gel to the surface of the plaster ceiling does not necessarily require a full scaffolding installation. In some embodiments, it may be applied with a boom lift or personnel device. It also avoids some of the debris and dust associated with drywall, second-layer plaster installations, or full plaster replacement.

Figure 7:
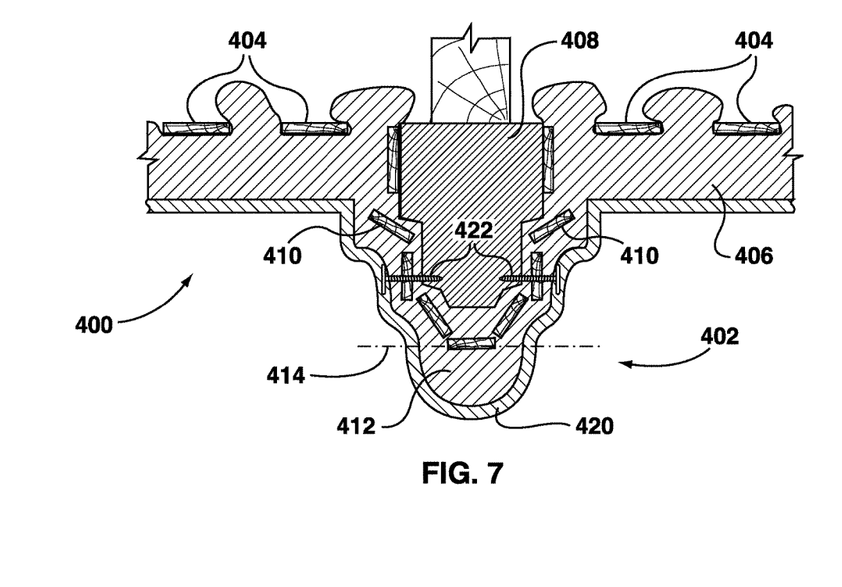
FIG. 7 shows a cross-section view of one example of a plaster rib with an aramid gel layer applied to its visible surface.

Reference is now made to FIG. 7, which shows a cross-sectional view of a plaster rib 402 formed in a plaster and lath ceiling 400. The ceiling 400 has been constructed using typical plaster 406 and lath 404. Such ribs 402 may be seen, for example, in gothic church ceilings and the like. In some North American churches, such plaster ribs 402 may have been constructed so as to mimic the actual stone ribs seen in older European cathedrals Like the plaster ceiling 400, in some cases the plaster ribs 402 may deteriorate and plaster may crack or fall.

In this example the plaster rib 402 is formed using a wooden template 408, such as lumber the length of which has been planed to form a template that roughly approximates the desired profile for the rib 402. The template 408 is attached to a structural support behind the ceiling 400 at various points to secure it in place prior to application of the plaster. Lath 410 may be nailed to the surface of the template 408. Plaster has then been applied (typically in multiple coats) to build up the visible surface of the ceiling 400 and the rib 402. The workman fashioning the rib 402 may have used a plastering tool with the desired profile shape for the rib to shape the plaster. In this example, the plaster that forms the rib 402 includes a substantial drop shape 412. In older plaster ceilings with plaster ribs, when cracks in the plaster ribs occur, they often occur along the line indicated generally by numeral 414.

Irrespective of whether the para-aramid gel is applied to the ceiling 400 generally, a layer of para-aramid gel 420 may be applied to the plaster rib 402 to bind the plaster together and to reinforce the rib and prevent (further) cracking or breakage.

In some installations, the layer of para-aramid gel 420 may be further reinforce using fasteners 422, such as screws and washers, secured in the lath 410 at the sides of the rib 402 and spaced along its length.

Although the above example relates to plaster ribs, the same or similar treatments may be used in the case of plaster cornice moldings, plaster coffers, etc.

Although the foregoing examples mention applying the para-aramid gel by spray, the gel may be applied in other ways, such as using a brush or roller. A typical layer of para-aramid gel may range in thickness from about between $1/16$ inch and $3/16$ inch, although thicker or thinner layers may be used in some embodiments.

Certain adaptations and modifications of the described embodiments can be made. Therefore, the above discussed embodiments are considered to be illustrative and not restrictive.

What is claimed is:

1. A thixotropic para-aramid gel for plaster reinforcement, comprising:
    a polymer resin, wherein the polymer resin includes at least an acrylate copolymer;
    an alkali-soluble anionic thickener;
    an adhesion promoter; and
    para-aramid pulp fibers.

2. The thixotropic para-aramid gel claimed in claim 1, wherein the para-aramid pulp fibers are present in an amount from about 1 to 5 percent by weight.

3. The thixotropic para-aramid gel claimed in claim 2, wherein the para-aramid pulp fibers are present in an amount of about 2 percent by weight.

4. The thixotropic para-aramid gel claimed in claim 1, wherein the polymer resin is present in an amount from about 60 to 80 percent by weight.

5. The thixotropic para-aramid gel claimed in claim 4, wherein the polymer resin is present in an amount of about 70 percent by weight.

6. The thixotropic para-aramid gel claimed in claim 1, wherein the alkali-soluble anionic thickener is present in an amount from about 20 to 30 percent by weight.

7. The thixotropic para-aramid gel claimed in claim 6, wherein the alkali-soluble anionic thickener is present in an amount of about 25 percent by weight.

8. The thixotropic para-aramid gel claimed in claim 1, wherein the adhesion promoter comprises a dispersion based on vinyl acetate and ethylene.

9. The thixotropic para-aramid gel claimed in claim 1, wherein the adhesion promoter is present in an amount of about 5 percent by weight.

10. A method of producing a para-aramid gel for plaster reinforcement, comprising:
    mixing a polymer resin, an alkali-soluble anionic thickener, and an adhesion promoter to create a thixotropic gel, wherein the polymer resin includes at least an acrylate copolymer; and
    spinning para-aramid pulp fibers into the thixotropic gel using a high shear mixer.

11. The method claimed in claim 10, wherein the spinning comprises mixing the thixotropic gel at about 2000 rpm and adding the para-aramid pulp fibers in small quantities to avoid clumping.

12. The method claimed in claim 10, wherein the para-aramid pulp fibers are about 1 to 5 percent by weight of the para-aramid gel.

13. The method claimed in claim 10, wherein the polymer resin is about 60 to 80 percent by weight of the thixotropic gel.

14. The method claimed in claim 10, wherein the alkali-soluble anionic thickener is about 20 to 30 percent by weight of the thixotropic gel.

15. The method claimed in claim 10, wherein the adhesion promoter is about 5 percent by weight of the thixotropic gel.

* * * * *